US005375874A

United States Patent [19]

Zushi

[11] Patent Number: 5,375,874

[45] Date of Patent: Dec. 27, 1994

[54] AIR BAG DEVICE FOR PASSENGER'S SEAT

[75] Inventor: Takayasu Zushi, Shiga, Japan

[73] Assignee: Takata Corporation, Tokyo, Japan

[21] Appl. No.: 50,668

[22] Filed: Apr. 22, 1993

[30] Foreign Application Priority Data

May 21, 1992 [JP] Japan .......................... 4-128729

[51] Int. Cl.[5] .......................... B60R 21/20

[52] U.S. Cl. .......................... 280/728 B

[58] Field of Search .......... 280/728 R, 728 A, 728 B, 280/730 R, 732, 743 R

[56] References Cited

U.S. PATENT DOCUMENTS 4,895,389 1/1990 Pack, Jr. .......................... 280/732
4,989,896 2/1991 DiSalvo et al. .................. 280/728 B
5,058,919 10/1991 Paquette et al. .

FOREIGN PATENT DOCUMENTS 4-197849 7/1992 Japan .......................... 280/728 B
4-274946 9/1992 Japan .......................... 280/743
1387152 3/1975 United Kingdom .

*Primary Examiner*—Karin L. Tyson
*Attorney, Agent, or Firm*—Kanesaka & Takeuchi

[57] ABSTRACT

An air bag device for a passenger's seat includes a module cover mounted to a case containing an air bag in a folded state protrusive strips for holding the folded air bag are provided on the rear of said module cover.

12 Claims, 6 Drawing Sheets

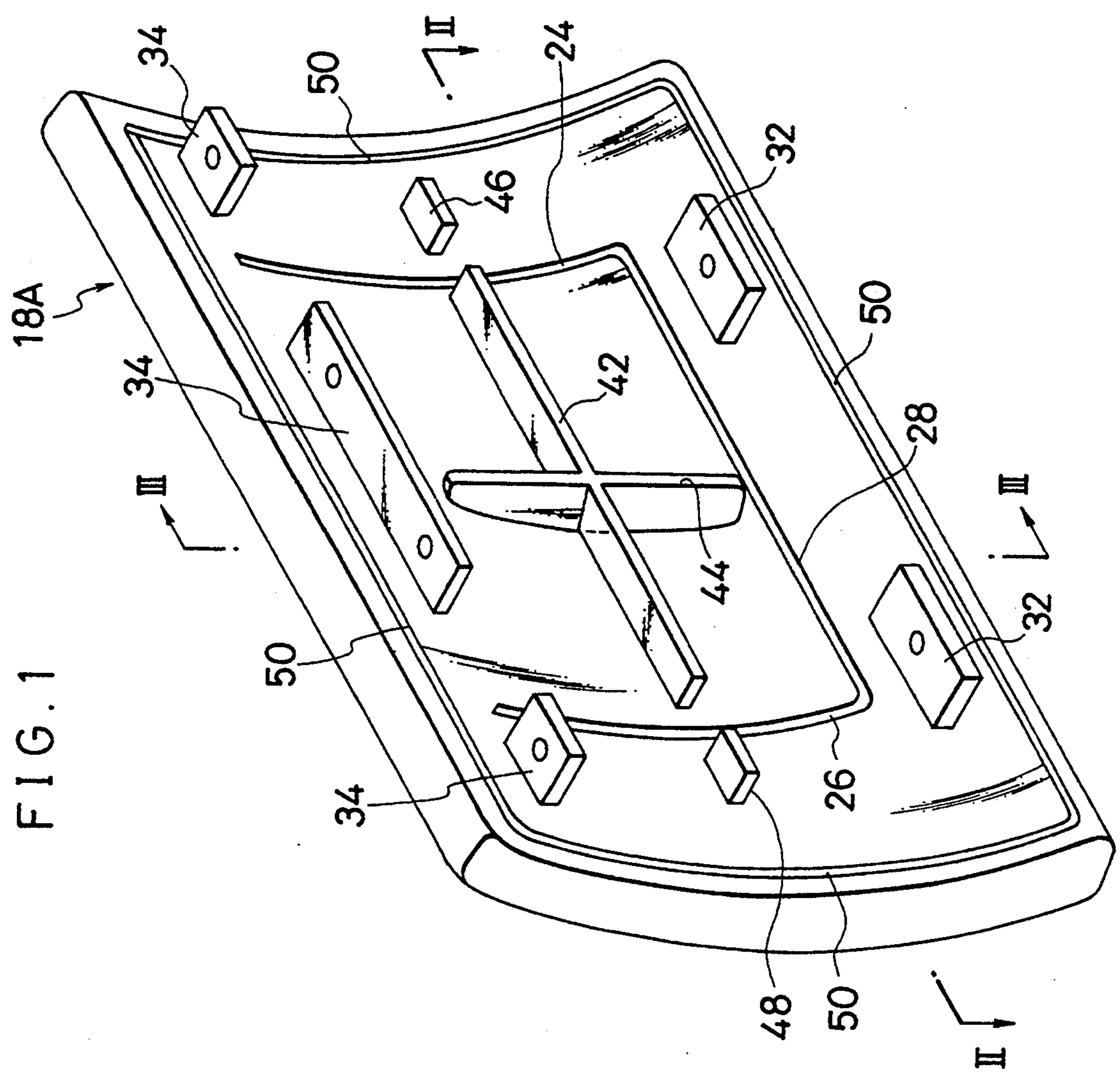
F I G . 1
18A
34
50
II
24
32
46
42
28
44
III
26
48

F I G. 2
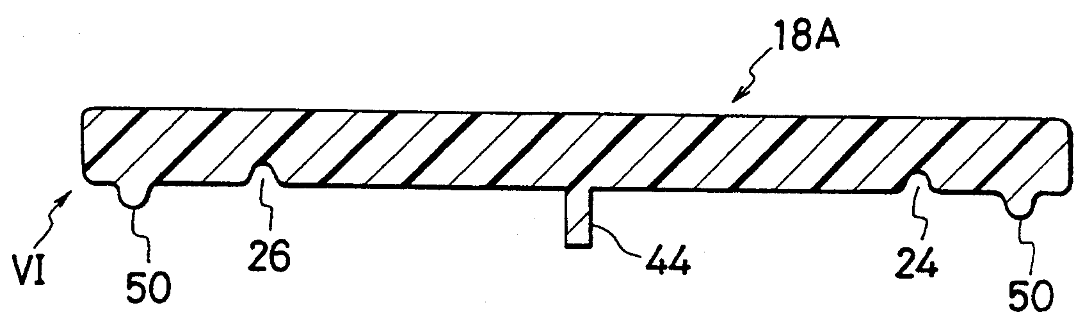
F I G. 3
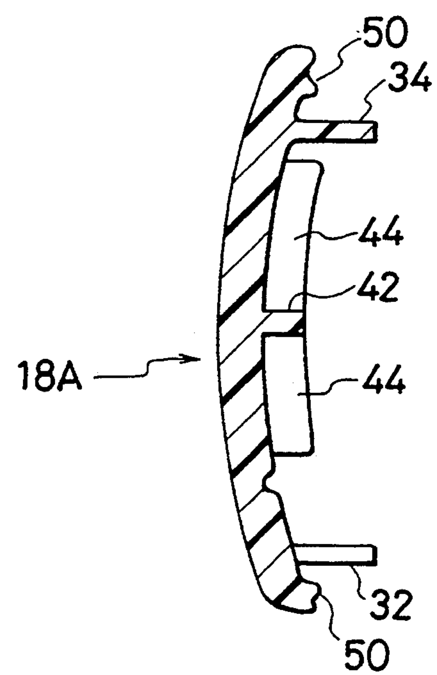

AIR BAG DEVICE FOR PASSENGER'S SEAT

FIELD OF THE INVENTION

The present invention relates to an air bag device for a passenger's seat provided on an instrument panel in front of a passenger's seat of a motor vehicle and, more particularly, to a structure of a module cover.

DESCRIPTION OF THE RELATED ART

In this type of an air bag device for a passenger's seat, an air bag and an inflator are mounted to a case (also referred to as a container), and a module cover is mounted so that it covers an opening of the case. The module cover is also referred to as a cover door or a deployment door. In the case that the vehicle crashes against something, the inflator is actuated to extend the air bag which in turn urges the module cover so as to cause it to open to the interior of the compartment, thereby causing the air bag to largely extend toward the interior of a cabin.

A general configuration and operation of a conventional air bag device for a passenger's seat will be described with reference to FIG. 7 to FIG. 9.

FIG. 7 is a schematic perspective view of the conventional air bag device for a passenger's seat. FIG. 8 is a sectional view taken along the line VIII—VIII in FIG. 7. FIG. 9 is a view illustrating operation thereof. The air bag device for a passenger's seat 10 comprises an air bag 14 stored in a case 12 in a folded state. An inflator 16 for causing the air bag 14 to extend is disposed in the case 12. The case 12 has an opening provided on the front or top thereof so that it faces the interior of the compartment of a motor vehicle. A module cover 18 for covering the opening is provided. The module cover 18 has a configuration wherein a metal reinforcing plate 18*b* is provided in (or on the rear of) a main body portion 18*a* made of synthetic resin. 20 represents an opening for mounting the air bag device provided on an instrument panel 22 of the motor vehicle.

Three tear lines 24, 26 and 28 are provided on the module cover 18. The tear line 24 extends along the edge on the left-hand side of the motor vehicle, and the tear line 26 extends along the edge of the right-hand side of the motor vehicle. The tear line 28 is provided so that it connects one end of the tear line 24 to one end of the tear line 26.

In order to mount the module cover 18 to the case 12, mounting pieces 32, 34 are provided so that they protrude from the rear of the module cover 18 and these mounting pieces 32, 34 are secured to the case 12 with rivets or bolts 36, 38, respectively.

In the case that a motor vehicle having the air bag 10 loaded thereon crashes against something, the inflator 16 is actuated to cause the air bag 14 to inflate, and the air bag 14 urges the module cover 18. As a result, the module cover 18 is torn at the tear lines 24, 26 and 28 and, as shown in FIG. 9, a door-shaped portion 30 surrounded by the tear lines 24, 26 and 28 begins to open as a door does. This causes the air bag 14 to largely extend toward the interior of the compartment.

In the conventional air bag device for a passenger's seat as described above, there is a tendency that a gap 40 is formed between the rear of the module cover 18 and the air bag 14 in a folded state. Such a gap 40 has caused the air bag 14 to move inside the case 12 as the motor vehicle moves up and down producing noises which have made the person on the motor vehicle anxious about problems.

Such a problem caused by the gap between the module cover 18 and the air bag 14 is specific to an air bag device for a passenger's seat. An air bag device for a driver's seat is mounted to a steering wheel. Therefore, it has a module cover made as small as possible; its air bag is folded to a small size; and the module cover is fixed to a mounting plate called retainer so that the air bag is strongly pushed by the module cover.

In the air bag device for a driver's seat, the folded air bag is thus put into tight contact with the module cover.

On the contrary, in the air bag device for a passenger's seat, the air bag has a capacity substantially larger than that of the air bag for a driver's seat. It is therefore a common practice to make the case 12 large accordingly, and to make the capacity of the case 12 somewhat greater than the folded air bag in order to allow the case to easily and completely contain the folded air bag. This is the reason why the gap between the folded air bag and the module cover is formed.

OBJECT AND SUMMARY OF THE INVENTION

It is an object of the present invention to provide an air bag device for a passenger's seat capable of suppressing movement of an air bag in a case whereby noises do not generate therein.

In an air bag device for a passenger's seat according to a first aspect of the present invention an air bag device for a passenger's seat includes a module cover mounted to a case containing an air bag in a folded state, wherein at least one protrusive strip for pushing the folded air bag is provided on the rear of the module cover.

In an air bag device for a passenger's seat according to a second aspect of the present invention the device according to the first aspect includes at least one tear line for tearing the module cover provided on the module cover, where the protrusive strip extends in a direction crossing the tear line.

In an air bag device for a passenger's seat according to a third aspect of the present invention the device according to the first aspect includes a rib provided at the peripheral portion of the rear of the module cover.

In such air bag devices for a passenger's seat according to the present invention, the protrusive strips provided on the module cover hold the folded air bag in the case, suppressing the movement of the air bag in the case.

When the protrusive strips push the air bag, the protrusive strips push the folded air bag. Therefore, unlike the case wherein the module cover as a whole pushes the folded air bag, it is possible to allow the protrusive strips push the surface of the folded air bag with a light force from the module cover. This results in a reduction of labor required for mounting the module cover to the case.

The air bag device for a passenger's seat according to the second aspect allows a reduction in bending stress applied to the tear line portion of the module cover. According to the present invention, the protrusive strips hold the air bag, resulting in a force in the direction of the interior of the compartment (a reactive force) applied to the module cover. If the protrusive strips extend along the tear lines, the reactive force is concentrated on the portions of the protrusive strips, i.e., it is concentrated on the tear line portions. Since the tear line portions on the module cover are weaker than other portions, fatigue of material progresses at the tear line portions of the module cover if such a pushing force from the air bag is continuously applied to the tear line portions.

However, in the air bag device for a passenger's seat according to the second aspect, the protrusive strips extend in a direction crossing the tear lines. Therefore, the reactive force applied by the air bag to the module cover is also loaded to portions of the module cover which are apart from the tear lines. In other words, the reactive force applied by the air bag to the module cover is dispersed in a wide range. As a result, the load applied to the tear line portions is reduced and the fatigue of material at the tear line portions is avoided.

The air bag device for a passenger's seat according to the third aspect ensures prevention of deformation such as warpage of the module cover. Specifically, according to the present invention, the air bag pushes the module cover on its rear, and the pushing force (reactive force) is concentrated on the portions of the protrusive strips. If the reactive force is concentrated on a part of the protrusive strips, it may cause warpage of the module cover.

However, in the air bag device for a passenger's seat according to the third aspect,a rib is provided at the periphery of the module cover to improve rigidity. This ensures prevention of the warpage of the module cover.

BRIEF DESCRIPTION OF THE DRAWINGS

FIG. 1 is a perspective view taken from the rear side of a module cover used in an embodiment of the present invention.

FIG. 2 is a sectional view taken along the line II—II in FIG. 1.

FIG. 3 is a sectional view taken along the line III—III in FIG. 1.

PREFERRED EMBODIMENTS

Preferred embodiments of the present invention will now be described with reference to the drawings. FIG. 1 is a perspective view taken from the rear side of a module cover 18A used in an air bag device for a passenger's seat, which relates to an embodiment of the present invention.

Figure 4:
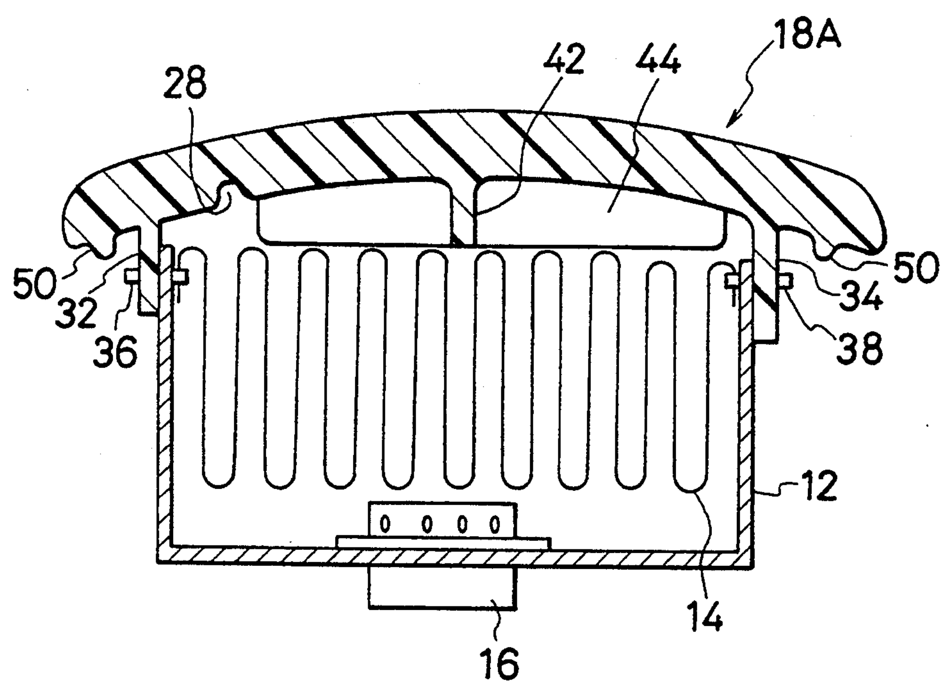
FIG. 4 is a longitudinal sectional view of an air bag device for a passenger's seat of an embodiment of the present invention.

FIG. 2 and FIG. 3 are sectional views taken along the lines II—II and III—III in FIG. 1, respectively. FIG. 4 is an overall longitudinal sectional view of an air bag device on which the module cover 18A is mounted.

In the present embodiment, protrusive strips 42 and 44 are provided on the rear of the module cover 18A so that they cross each other. In the direction of the extension of the protrusive strip 42, protrusive strips 46 and 48 are provided in positions such that tear lines 24 and 26, respectively, are sandwiched. A rib 50 is provided so that it protrudes along the peripheral portion of the module cover 18A.

The configuration is similar to the above-described prior art except the above, and description will be omitted for like parts which are given like reference numerals.

In the air bag device having the module cover 18A formed as described above, the protrusive strips 42, 44, 46 and 48 push the air bag 14 in a folded state as shown in FIG. 4. This prevents the air bag 14 from moving in the case 14.

Further, according to the present embodiment, the protrusive strips 42, 46 and 48 extend in a direction perpendicular to the tear lines 24 and 26, and the protrusive strip 44 extends in a direction perpendicular to the tear line 28. Therefore, the reactive force applied by the air bag 14 to the protrusive strips 42, 44, 46 and 48 is dispersed in the entire surface of the rear of the module cover 18A and will not put provide localized loads on the tear lines 24, 26 and 28. This prevents fatigue of material at the portions of tear lines 24, 26 and 28 of the module cover 18A.

In addition, since the rib 50 is provided at the entire periphery of the rear of the module cover 18A in the present embodiment, the rigidity of the module cover 18A is improved to ensure prevention of warpage.

Figure 5:
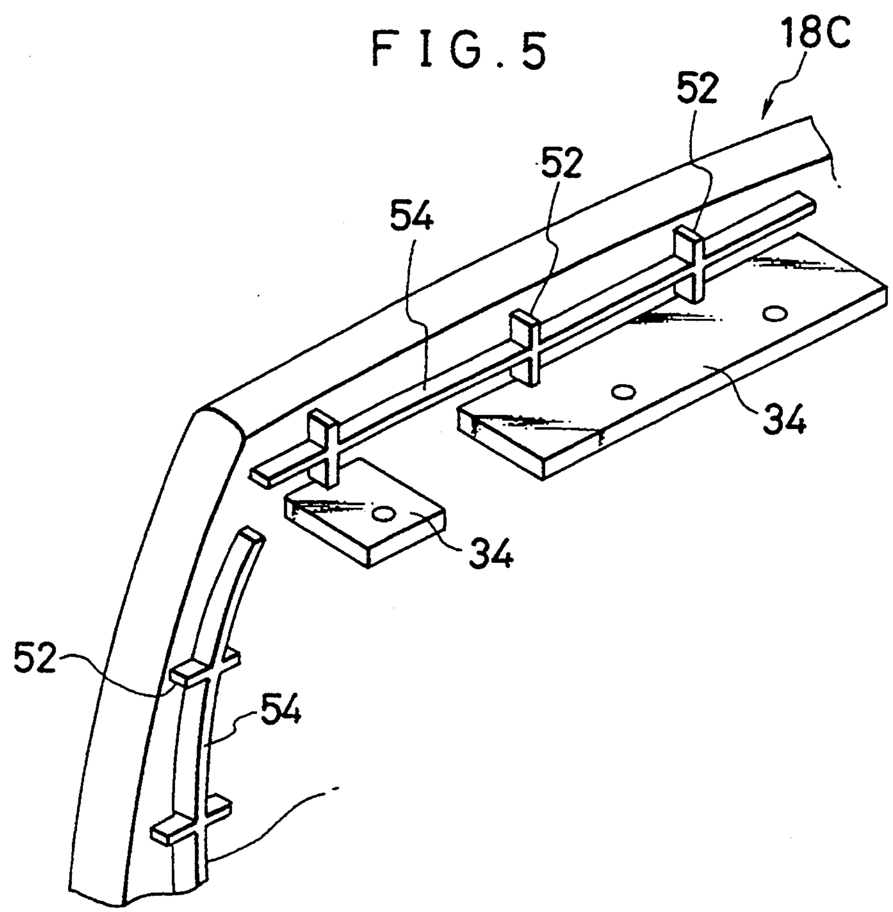
FIG. 5 is a perspective view showing major parts of a module cover used in another embodiment of the present invention.
Figure 6:
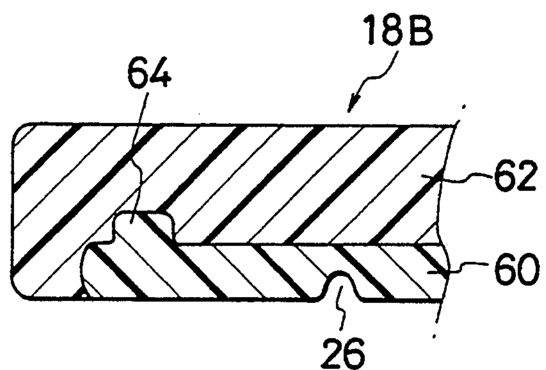
FIG. 6 is a perspective view showing major parts of a module cover used in a further embodiment of the present invention.
Figure 7:
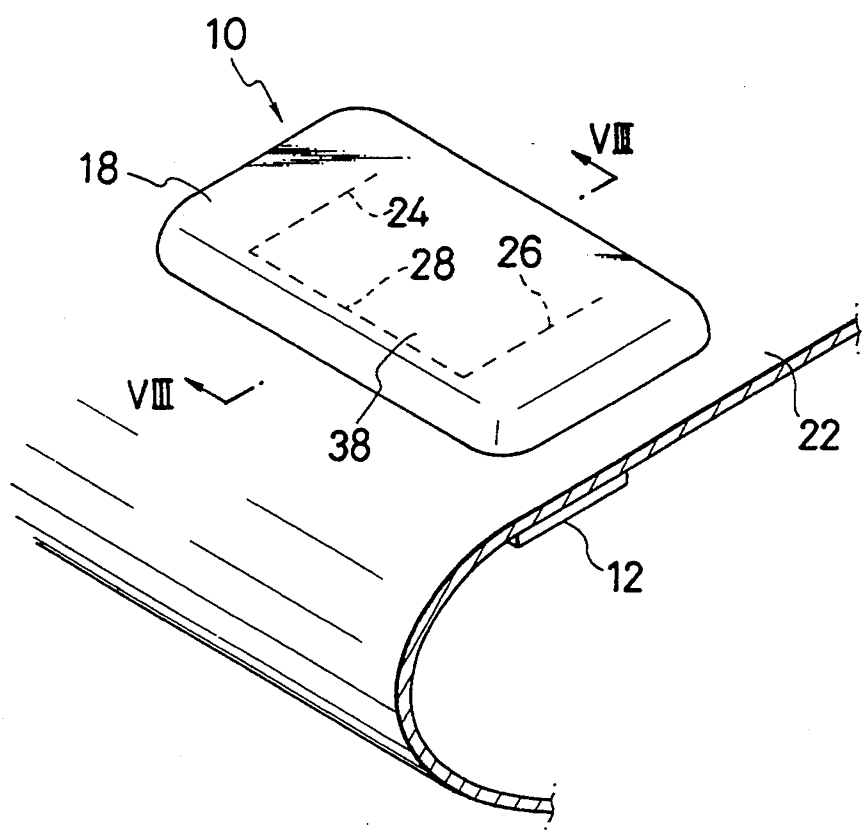
FIG. 7 is a perspective view showing the prior art.
Figure 8:
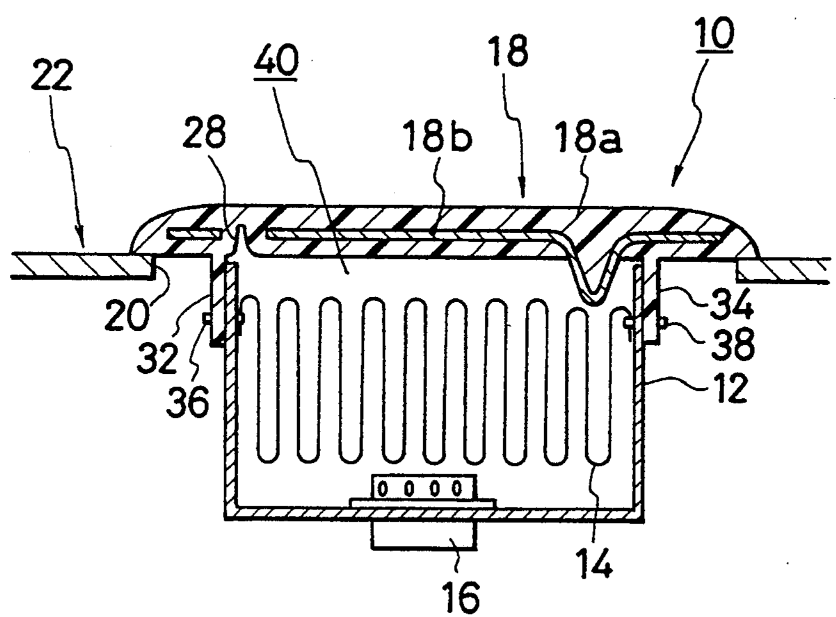
FIG. 8 is a sectional view taken along the line VIII—VIII in FIG. 7.
Figure 9:
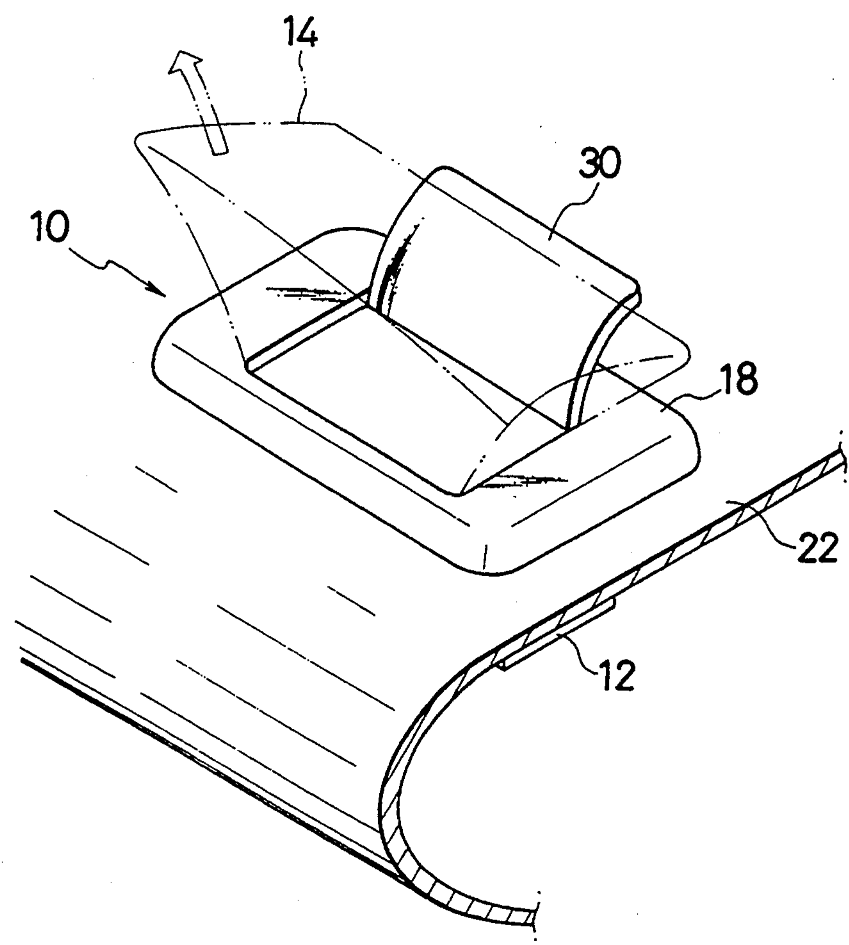
FIG. 9 is a perspective view illustrating the operation of an air bag device for a passenger's seat.

Although the rib 50 in the above embodiment is provided so that it protrudes around the periphery of the rear of the module cover 18A, what is necessary in the present invention is a rib which improves the flexural rigidity of the module cover. Therefore, the rib may be different from that shown in FIG. 1. For example, as seen on a module cover 18C shown in FIG. 5, it is possible to provide a rib 54 extending in the direction of the periphery thereof and a shorter rib 52 extending in a direction perpendicular thereto. Further, in the case that the module cover is a module cover 18B constituted by a laminated element consisting of an inner layer 60 made of hard rigid resin and an outer layer 62 made of soft rigid resin as shown in FIG. 6, a rib 64 may be provided on the inner layer 60 so that it protrudes on a surface which overlaps with the outer layer. FIG. 6 is an enlarged sectional view of a part corresponding to the portion VI in FIG. 2.

As described above, in the air bag device for a passenger's seat according to the present invention, the movement of the air bag in the case is suppressed, and generation of noises in the case is avoided.

Also, bending stress applied to the tear line portions is reduced; fatigue of material at the module cover is prevented; and durability of the module cover is thus improved.

The air bag device for a passenger's seat ensures prevention of warpage of the module cover.

What is claimed is:

1. An air bag device for a passenger's seat, wherein a module cover is mounted to a case containing an air bag in a folded state, protrusive strips for holding said folded air bag being provided on a center and a peripheral portion of a rear of said module cover, said protrusive strip at the peripheral portion being provided on an imaginary line extending from the protrusive strip at the center.

2. An air bag device for a passenger's seat according to claim 1 wherein at least one tear line for tearing said module cover is provided on said module cover and said protrusive strip extends in a direction crossing said tear line.

3. An air bag device for a passenger's seat according to claim 1 further comprising a rib provided at a peripheral portion of the rear of said module cover.

4. An air bag device for a passenger's seat according to claim 3 wherein said rib includes a longer rib extending along the peripheral portion and a shorter rib in a crossing relationship therewith.

5. An air bag device for a passenger's seat according to claim 1, wherein the protrusive strips are provided on the rear of said module cover such that they cross each other.

6. An air bag device for a passenger's seat according to claim 2, wherein the protrusive strips are provided on both sides of the tear line.

7. An air bag device for a passenger's seat according to claim 3, wherein the rib is provided on an entire periphery of the rear of the module cover.

8. An air bag device for a passenger's seat having a module cover adapted to be attached to a case containing an air bag in a folded state for covering an opening of the case, said module cover comprising, a U-shaped tear line extending along side portions of the module cover, and two protrusive strips formed at a center of a rear of the module cover and surrounded by the U-shaped tear line, said two protrusive strips crossing each other at the center thereof so that each protrusive strip extends parallel to one part of the tear line and perpendicularly to another part of the tear line, a height of said two protrusive strips at a crossing portion thereof being substantially equal and said protrusive strips pushing the folded air bag in the container when the module cover is fixed to the container so that movement of the folded air bag in the container is substantially prevented.

9. An air bag device for a passenger's seat according to claim 8, wherein one of the protrusive strips has a peripheral portion located outside the U-shaped tear line and on an imaginary line extending from the strip at the center thereof.

10. A module cover for an air bag device for a passenger's seat adapted to be attached to a case containing an air bag in a folded state for covering an opening of the case, comprising, a U-shaped tear line extending along side portions of the module cover, and two protrusive strips formed at a center of a rear of the module cover and surrounded by the U-shaped tear line, said two protrusive strips crossing each other at the center thereof so that each protrusive strip extends parallel to one part of the tear line and perpendicularly to another part of the tear line, a height of said two protrusive strips at a crossing portion thereof being substantially equal and said protrusive strips pushing the folded air bag in the container when the module cover is fixed to the container so that movement of the folded air bag in the container is substantially prevented.

11. A module cover according to claim 10, further comprising a rib provided at a peripheral portion of the rear of the module cover, said rib having short ribs extending perpendicularly to the rib at the peripheral portion.

12. A module cover according to claim 10, wherein said module cover is formed of an inner layer made of a hard resin, and a smooth outer layer made of a soft resin and located outside the inner layer, said inner layer having a rib provided at a peripheral portion of the module cover and protruded toward the outer layer.

* * * * *